(12) United States Patent
Hsieh

(10) Patent No.: US 10,434,585 B2
(45) Date of Patent: Oct. 8, 2019

(54) SAW BLADE POSITIONING MECHANISM FOR ANNULAR SAWING MACHINE

(71) Applicant: LEE YEONG INDUSTRIAL CO., LTD., Douliu, Yunlin County (TW)

(72) Inventor: Pan-Chung Hsieh, Yunlin County (TW)

(73) Assignee: LEE YEONG INDUSTRIAL CO., LTD., Douliu, Yunlin County (TW)

( * ) Notice: Subject to any disclaimer, the term of this patent is extended or adjusted under 35 U.S.C. 154(b) by 295 days.

(21) Appl. No.: 15/394,038

(22) Filed: Dec. 29, 2016

(65) Prior Publication Data

US 2018/0185934 A1 Jul. 5, 2018

(51) Int. Cl.
*B23D 45/16* (2006.01)
*B23D 47/12* (2006.01)
*B28D 1/04* (2006.01)
*B27G 19/02* (2006.01)

(52) U.S. Cl.
CPC .......... *B23D 45/16* (2013.01); *B23D 47/123* (2013.01); *B27G 19/02* (2013.01); *B28D 1/04* (2013.01)

(58) Field of Classification Search
CPC ...... B26B 25/00; B23D 45/16; B23D 47/123; B27G 19/02; B28D 1/04
USPC .......................... 30/276, 388, 389; 125/13.01
See application file for complete search history.

(56) References Cited

U.S. PATENT DOCUMENTS

| 2,972,363 | A | * | 2/1961 | Santilli | B27B 5/14 30/389 |
| 3,024,532 | A | * | 3/1962 | Bettcher | B26B 25/002 30/276 |
| 3,135,304 | A | * | 6/1964 | Breer et al. | B27B 5/14 30/276 |
| 3,373,489 | A | * | 3/1968 | Giles | A01G 3/08 30/388 |
| 3,688,403 | A | * | 9/1972 | Bettcher | B26B 25/002 30/276 |
| 3,930,310 | A | * | 1/1976 | Santilli | B23D 59/02 30/389 |

(Continued)

FOREIGN PATENT DOCUMENTS

| DE | 202016107385 U1 | * | 3/2017 | .......... B23D 47/123 |
| FR | 3061448 A3 | * | 7/2018 | |
| GB | 2558555 A | * | 7/2018 | ............. B23D 45/16 |

Primary Examiner — Jason Daniel Prone
(74) Attorney, Agent, or Firm — Muncy, Geissler, Olds & Lowe, PC

(57) ABSTRACT

A saw blade positioning mechanism for an annular sawing machine includes a protective case, two first driven wheels, two second driven wheels, and an adjustment component. The protective case conceals a portion of an annular saw blade. The first and second driven wheels are rotatably disposed at two opposing ends of the protective case and abut against two opposing lateral sides of the annular saw blade, respectively. The adjustment component is disposed at the protective case to drive the protective case to move in the radial direction of the annular saw blade relative to the annular saw blade. The position of the protective case is adjusted with the adjustment component such that the first and second driven wheels get positioned in place synchronously with displacement of the protective case. The protective case can be demounted so that the first and second driven wheels are simultaneously removed and changed.

3 Claims, 6 Drawing Sheets

(56) References Cited

U.S. PATENT DOCUMENTS

| | | | | | |
|---|---|---|---|---|---|
| 4,166,317 | A | * | 9/1979 | Bettcher | B26B 25/002 30/276 |
| 4,472,880 | A | * | 9/1984 | Johansson | B23D 47/123 30/389 |
| 4,516,323 | A | * | 5/1985 | Bettcher | B26B 25/002 30/276 |
| 4,646,607 | A | * | 3/1987 | Johansson | B23D 47/123 30/389 |
| 4,793,065 | A | * | 12/1988 | Johansson | B23D 47/005 30/389 |
| 4,942,665 | A | * | 7/1990 | McCullough | A22C 17/04 30/276 |
| 5,009,011 | A | * | 4/1991 | Johansson | B23D 47/123 30/389 |
| 5,664,332 | A | * | 9/1997 | Whited | B26B 25/002 30/276 |
| 5,674,119 | A | * | 10/1997 | DesRosiers | A61C 13/12 451/344 |
| 5,761,817 | A | * | 6/1998 | Whited | B26B 25/002 30/276 |
| 5,940,972 | A | * | 8/1999 | Baris | B26B 25/002 30/276 |
| 6,243,956 | B1 | * | 6/2001 | Nilsson | B23D 47/123 30/389 |
| 6,336,273 | B1 | * | 1/2002 | Nilsson | B23D 45/16 30/276 |
| 6,751,872 | B1 | * | 6/2004 | Whited | B26B 25/002 30/276 |
| 7,225,545 | B2 | * | 6/2007 | Blatz | B23D 47/123 30/389 |
| 7,740,012 | B2 | * | 6/2010 | Donnerdal | B23D 45/16 125/13.01 |
| 8,281,493 | B2 | * | 10/2012 | Levsen | A22B 5/165 30/276 |
| 8,661,692 | B2 | * | 3/2014 | Whited | B26B 25/002 30/276 |
| 8,950,076 | B2 | * | 2/2015 | Whited | A22B 5/165 30/276 |
| 2003/0066404 | A1 | * | 4/2003 | Giwojna | B23D 47/123 83/591 |
| 2005/0217119 | A1 | * | 10/2005 | Rapp | A22B 5/165 30/276 |
| 2007/0283573 | A1 | * | 12/2007 | Levsen | A22B 5/165 30/276 |
| 2009/0229133 | A1 | * | 9/2009 | Campeau | B23D 47/123 30/389 |
| 2012/0066918 | A1 | * | 3/2012 | Campeau | B23D 47/123 30/389 |
| 2013/0031789 | A1 | * | 2/2013 | Levsen | A22B 5/165 30/276 |
| 2015/0298328 | A1 | * | 10/2015 | Levsen | B26B 25/002 30/276 |
| 2015/0298329 | A1 | * | 10/2015 | Levsen | A22B 5/165 30/276 |

* cited by examiner

SAW BLADE POSITIONING MECHANISM FOR ANNULAR SAWING MACHINE

BACKGROUND OF THE INVENTION

1. Field of the Invention

The present invention relates to annular sawing machines and, more particularly, to a saw blade positioning mechanism for an annular sawing machine.

2. Description of the Prior Art

An annular sawing machine is intended to cut stone and operated with a motor for driving an active wheel to rotate. The active wheel is engaged with an annular saw blade to drive the annular saw blade to rotate together with the active wheel, thereby causing the annular saw blade to cut stone.

To be positioned in place during an assembly process, the annular saw blade is disposed between the active wheel and two driven wheels to allow the active wheel to exert an inward force on the annular saw blade and allow the two driven wheels to exert an outward force on the annular saw blade. It is only when the two forces are in equilibrium that the annular saw blade rotates smoothly. However, according to the prior art, a repair performed on the annular saw blade not only entails demounting and mounting the two driven wheels separately, but also necessitates adjustment in the positions of the two driven wheels upon completion of the mounting process. If one of the driven wheels is dislocated, the annular saw blade will rotate badly or even be predisposed to structural damage. In view of this, the annular saw blade disclosed in the prior art is confronted with two problems: complicated demounting and mounting processes, and low precision of assembly.

SUMMARY OF THE INVENTION

It is an objective of the present invention to provide a saw blade positioning mechanism for an annular sawing machine so that the annular sawing machine not only demonstrates high precision when assembled, but is also easy to demount and mount to the advantage of maintenance.

In order to achieve the above and other objectives, the present invention provides a saw blade positioning mechanism for an annular sawing machine. The annular sawing machine comprises a driving source, an annular saw blade, and an active wheel. The annular saw blade has a first lateral side and a second lateral side facing away from the first lateral side. The first lateral side has positioning annular grooves. The active wheel is connected to the driving source and engaged with an annular surface of the annular saw blade such that the active wheel is driven by the driving source to drive the annular saw blade to rotate. The saw blade positioning mechanism of the present invention comprises a protective case, two opposing first driven wheels, two opposing second driven wheels, and an adjustment component. The protective case is movable in the radial direction of the annular saw blade, movably mounted on an outer circumferential surface of the driving source, and adapted to conceal a portion of the annular saw blade. The two first driven wheels are rotatably disposed at the protective case, positioned to flank the active wheel, and insertedly engaged with the positioning annular grooves of the first lateral side of the annular saw blade; hence, the two first driven wheels are driven by the annular saw blade to rotate. The two second driven wheels are rotatably disposed at the protective case, positioned to flank the active wheel, and abutting against the second lateral side of the annular saw blade; hence, the two second driven wheels are driven by the annular saw blade to rotate. The adjustment component is disposed at the protective case to drive the protective case to move in the radial direction of the annular saw blade relative to the annular saw blade.

To mount the saw blade positioning mechanism, the position of the protective case is adjusted with the adjustment component such that the first and second driven wheels get positioned in place synchronously with displacement of the protective case. Hence, it is not necessary to adjust the driven wheels one by one. The annular sawing machine demonstrates high precision when assembled. The protective case can be demounted so that the first and second driven wheels are simultaneously removed and changed, thereby enhancing the ease of demounting, mounting, and maintenance.

According to the present invention, the protective case has an active wheel recess and two guide shaft holes, with the active wheel recess adapted to contain the active wheel and disposed between the two guide shaft holes, allowing the two guide shaft holes of the protective case to each movably fit around a guide shaft, with the two guide shafts fixed to the outer circumferential surface of the driving source. Hence, the protective case enhance the stability of operation by means of the two guide shafts.

According to the present invention, the protective case has a receiving recess, and the adjustment component has a fixing plate, a knob, and two resilient elements, with the fixing plate movably disposed in the receiving recess of the protective case and having an adjustment screw hole, with the knob having a knob head and an adjustment screw connected to the knob head, with the knob head disposed outside the receiving recess of the protective case, with the adjustment screw screwed to the adjustment screw hole of the fixing plate, wherein the adjustment screw has an end connected to the knob head and another end abutting against a wall of the receiving recess, wherein the two resilient elements each have an end abutting against the fixing plate and another end abutting against the wall of the receiving recess. With the adjustment screw being screwed to the adjustment screw hole of the fixing plate, the knob is rotated to drive the fixing plate to move and thereby compress the two resilient elements; hence, the two resilient elements push the protective case, causing the protective case to move in the radial direction of the annular saw blade.

According to the present invention, the protective case further has two opposing first fixing holes, and the fixing plate further has two opposing second fixing holes which flank the adjustment screw hole, with the adjustment component having two fixing elements, wherein the two fixing elements each have an end insertedly disposed in a corresponding one of the first fixing holes of the protective case and another end fixed to a corresponding one of the second fixing holes of the fixing plate, wherein the two resilient elements fit around the fixing elements, respectively. Hence, the two resilient elements are fixed in place by the two fixing elements, respectively.

Fine structures, features, assembly, and operation of the saw blade positioning mechanism provided by the present invention are illustrated by specific embodiments and described below. However, persons skilled in the art understand that the description and specific embodiments of the present invention are illustrative of the present invention rather than restrictive of the claims of the present invention.

DETAILED DESCRIPTION OF THE EMBODIMENT OF THE INVENTION

Figure 1:
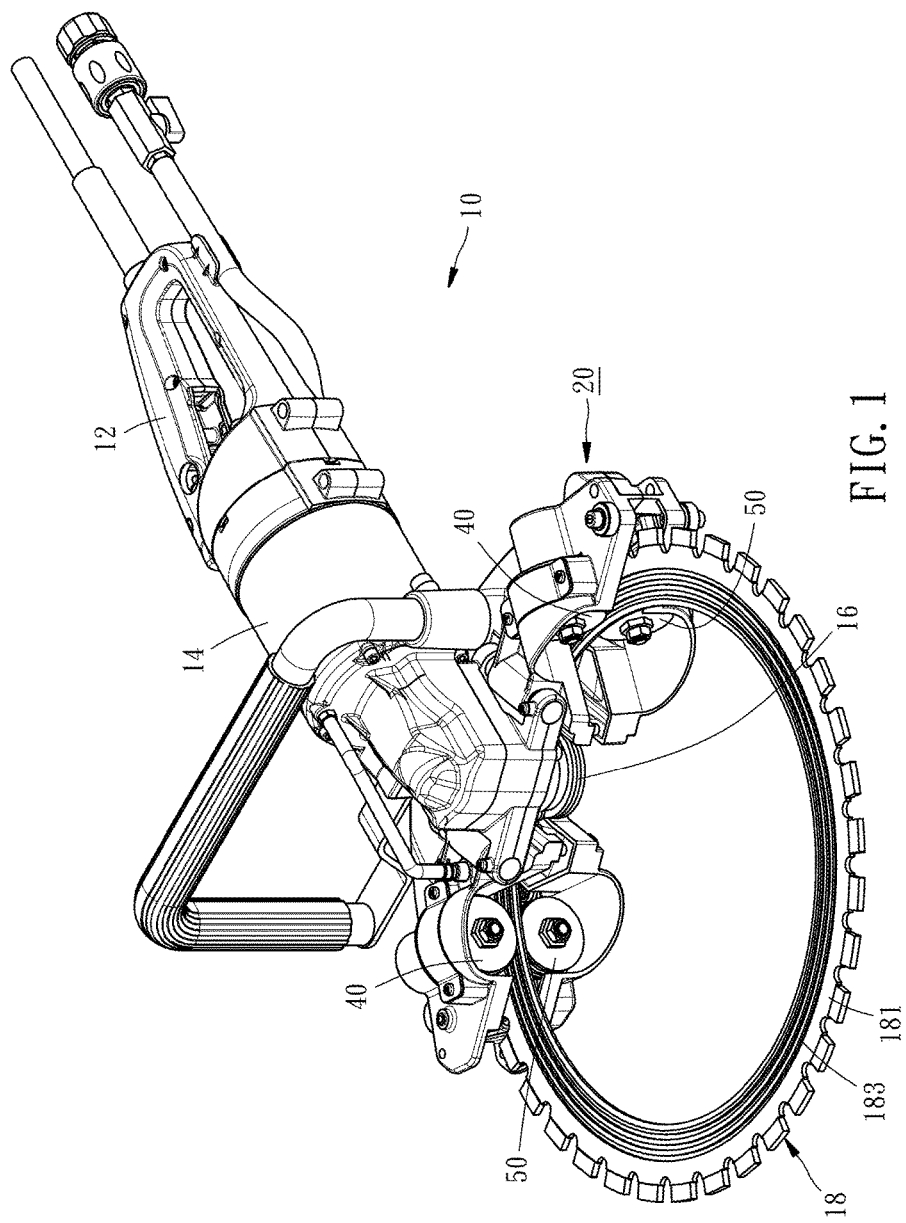
FIG. 1 is a perspective view of a saw blade positioning mechanism for an annular sawing machine according to the present invention.
Figure 2:
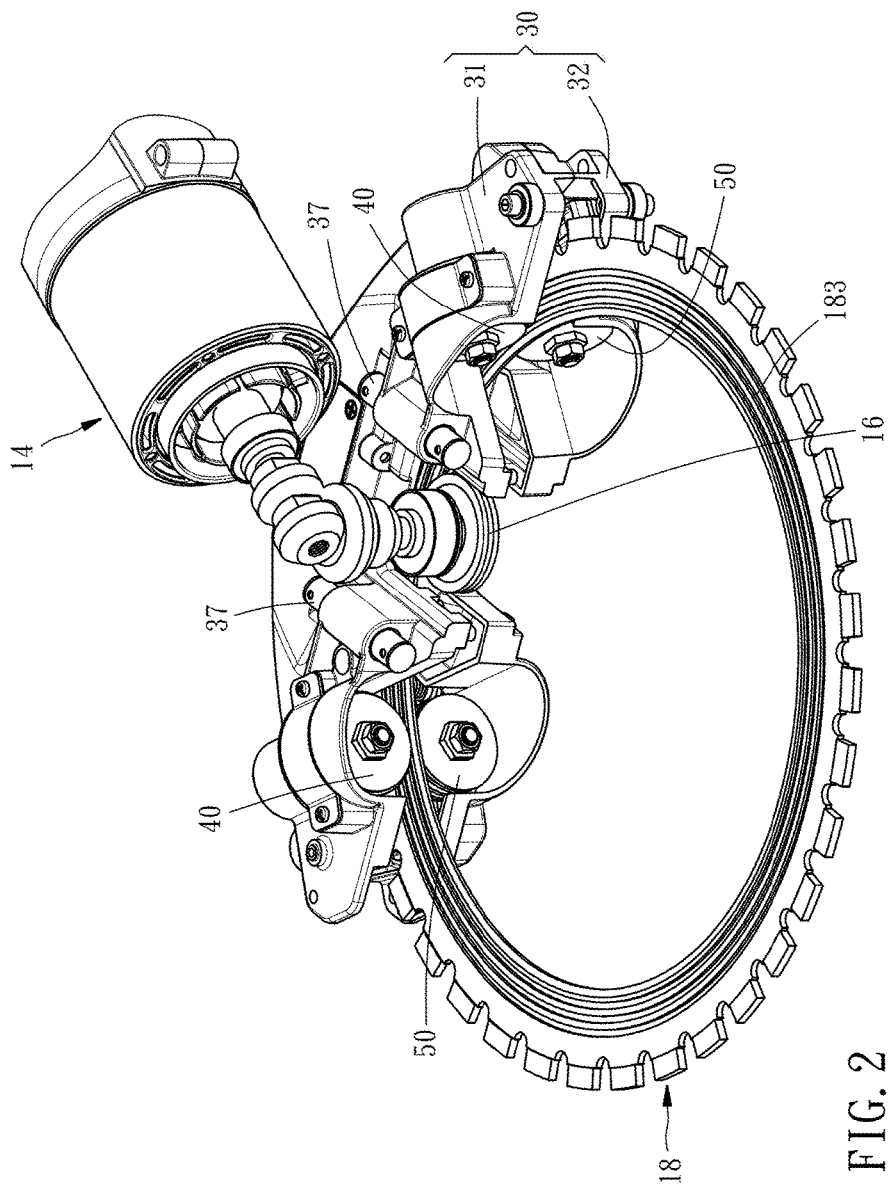
FIG. 2 is a partial perspective view of the saw blade positioning mechanism according to the present invention.

Referring to FIG. 1 and FIG. 2, an annular sawing machine 10 comprises a handle 12. The front end of the handle 12 is connected to a driving source 14. The front end of the driving source 14 is connected to an active wheel 16. The active wheel 16 is engaged with an annular surface of an annular saw blade 18 such that the active wheel 16 is driven by the driving source 14 to rotate, thereby allowing the driving source 14 to drive the annular saw blade 18 to rotate together with the driving source 14. The annular saw blade 18 has a first lateral side 181 and a second lateral side 182 facing away from the first lateral side 181 (shown in FIG. 6). The first lateral side 181 has three equally spaced positioning annular grooves 183.

Figure 3:
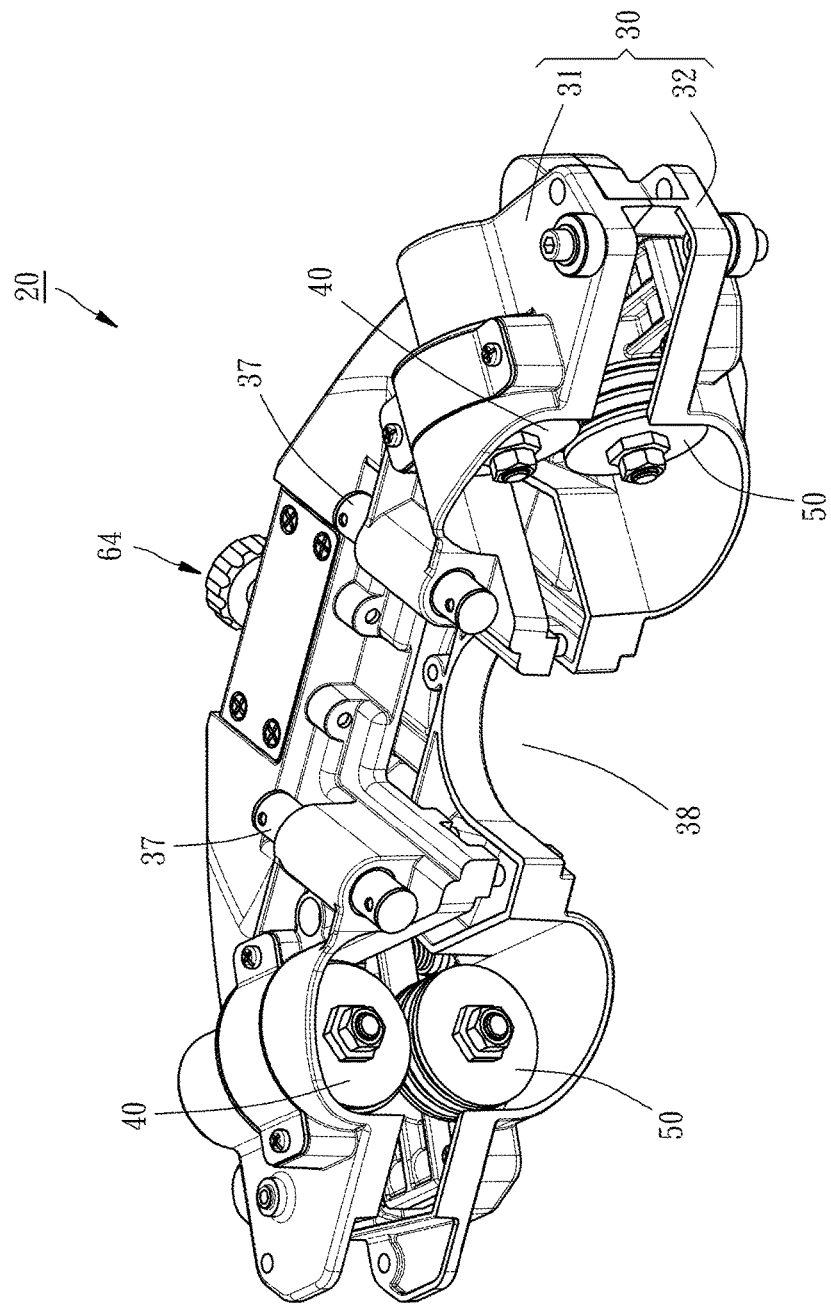
FIG. 3 is a perspective view of the saw blade positioning mechanism according to the present invention.
Figure 4:
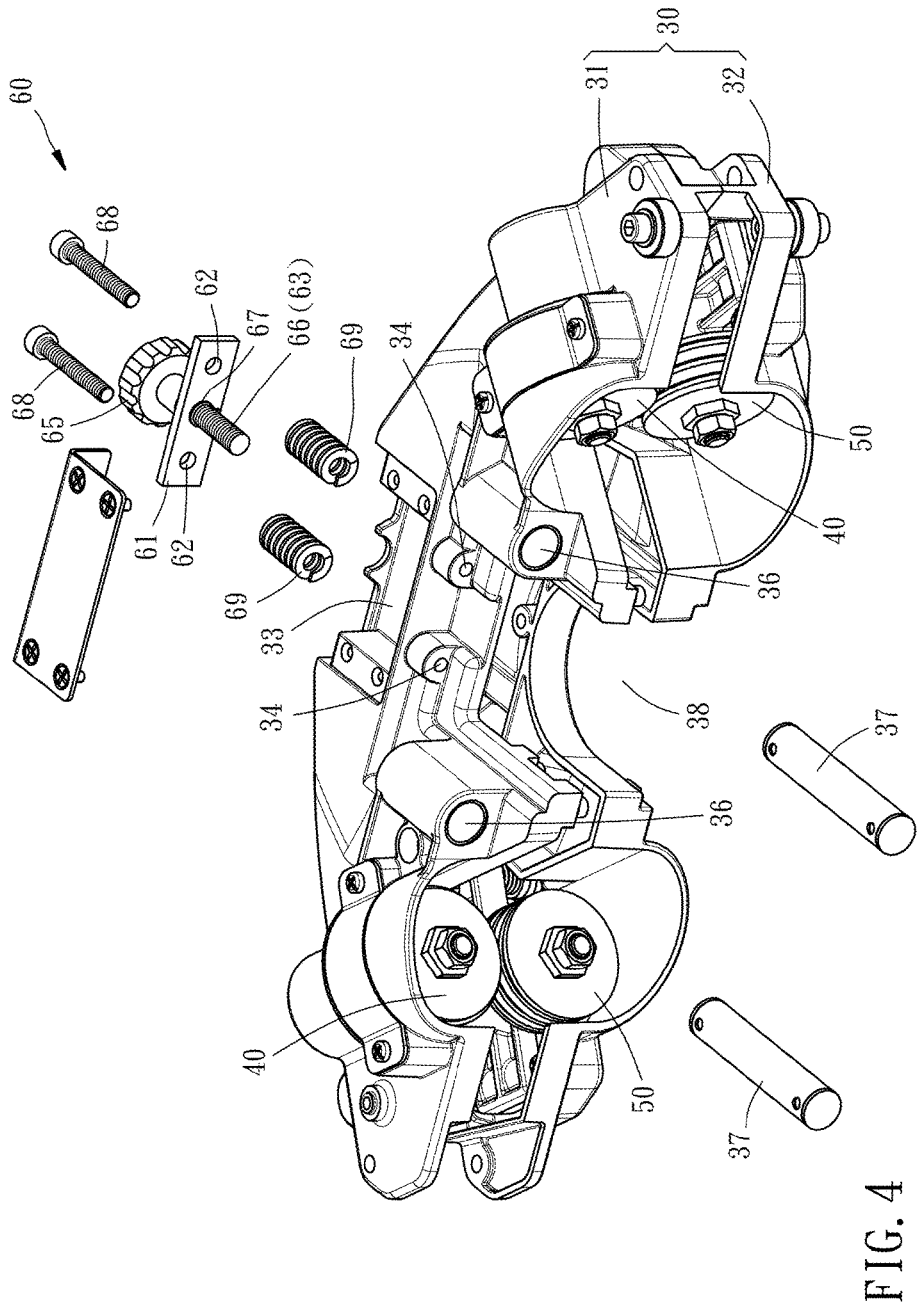
FIG. 4 is a partial exploded view of the saw blade positioning mechanism according to the present invention.

Referring to FIG. 3 and FIG. 4, the present invention provides a saw blade positioning mechanism 20 which comprises a protective case 30, two opposing first driven wheels 40, two opposing second driven wheels 50, and an adjustment component 60.

The protective case 30 has a first case body 31 and a second case body 32. The first case body 31 is disposed above the first lateral side 181 of the annular saw blade 18. The second case body 32 is disposed below the second lateral side 182 of the annular saw blade 18. The first and second case bodies 31, 32 are connected head-to-head such that the protective case 30 is adapted to conceal a portion of the annular saw blade 18. Referring to FIG. 4, a receiving recess 33 is disposed centrally at the outer edge of the first case body 31. Two opposing first fixing holes 34 are disposed on the wall of the receiving recess 33. Two opposing guide shaft holes 36 are disposed centrally at the inner edge of the first case body 31. The two guide shaft holes 36 are not only axially parallel to the first fixing holes 34 but also parallel to the radial direction of the annular saw blade 18. The two guide shaft holes 36 of the protective case 30 each movably fit around a guide shaft 37. Two guide shafts 37 are fixed to the outer circumferential surface of the driving source 14, as shown in FIG. 1 and FIG. 2, such that the protective case 30 can move in the axial direction of the two guide shafts 37 (i.e., the radial direction of the annular saw blade 18) relative to the annular saw blade 18. An active wheel recess 38 is disposed centrally at the inner edge of the second case body 32 and between the two guide shaft holes 36 of the first case body 31 to contain the active wheel 16.

Figure 6:
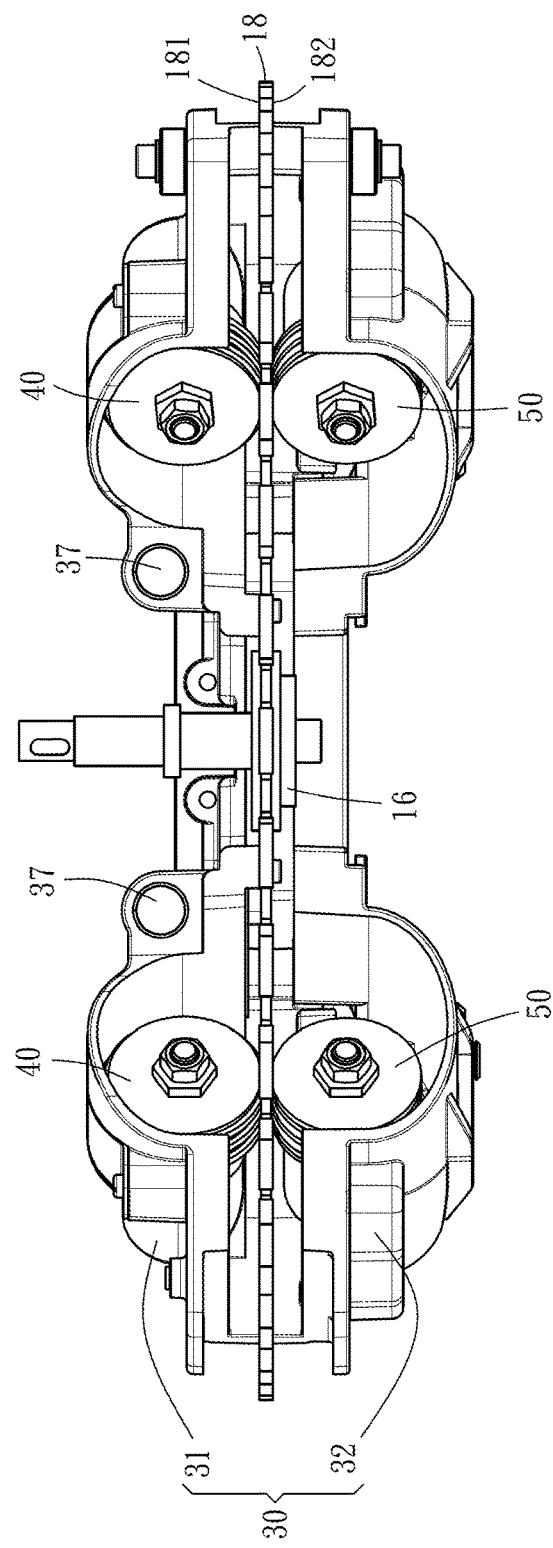
FIG. 6 is a front view of the saw blade positioning mechanism according to the present invention.

The two first driven wheels 40 are mounted at two ends of the first case body 31 of the protective case 30, respectively, to flank the active wheel 16. The two first driven wheels 40 are insertedly engaged with the positioning annular grooves 183 of the first lateral side 181 of the annular saw blade 18, as shown in FIGS. 1, 2 and 6. The protective case 30 undergoes a displacement to exert an outward force on the annular saw blade 18; hence, the annular saw blade 18 is positioned between the active wheel 16 and the two first driven wheels 40. Accordingly, in the course of its rotation, the annular saw blade 18 drives the two first driven wheels 40 to rotate.

The two second driven wheels 50 are mounted at two ends of the second case body 32 of the protective case 30, respectively, to flank the active wheel 16. The two second driven wheels 50 abut against the second lateral side 182 of the annular saw blade 18, as shown in FIG. 6; hence, the two second driven wheels 50 not only lend support to the annular saw blade 18, but are also driven by the annular saw blade 18 to therefore rotate together with the annular saw blade 18.

Figure 5:
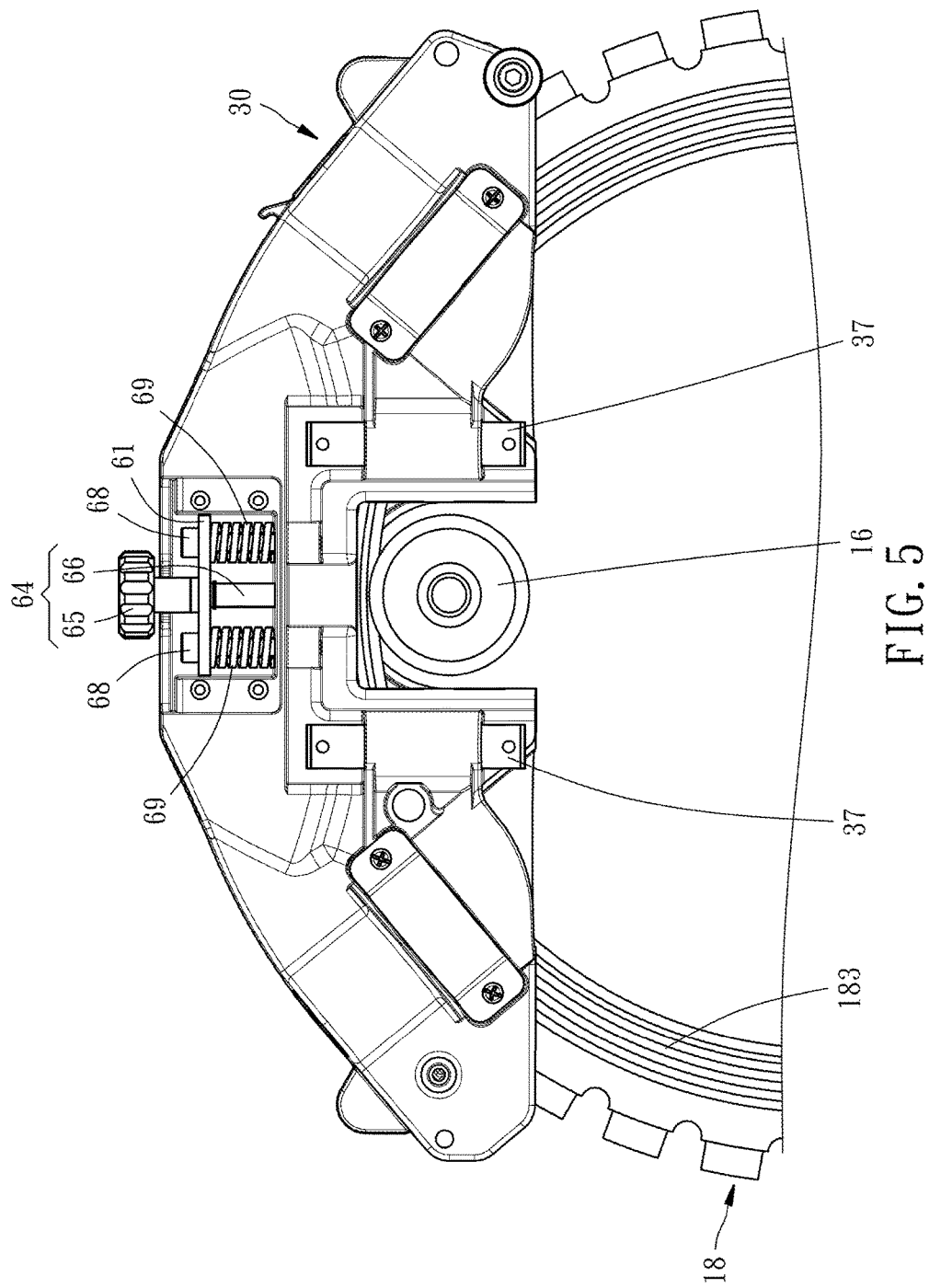
FIG. 5 is a partial top view of the saw blade positioning mechanism according to the present invention.

The adjustment component 60 has a fixing plate 61 and a knob 64, as shown in FIG. 4 and FIG. 5. The fixing plate 61 is disposed in the receiving recess 33 of the first case body 31 of the protective case 30. The fixing plate 61 has two second fixing holes 62 and an adjustment screw hole 63 disposed between the two second fixing holes 62. The knob 64 has a knob head 65 and an adjustment screw 66. One end of the knob head 65 is disposed outside the receiving recess 33 of the first case body 31 of the protective case 30. The other end of the knob head 65 is disposed in the receiving recess 33 of the first case body 31 of the protective case 30. The adjustment screw 66 is screwed to the adjustment screw hole 63 of the fixing plate 61 and prevented from separating from the fixing plate 61 by a fastener 67. One end of the adjustment screw 66 is connected to the knob head 65. The other end of the adjustment screw 66 abuts against the wall of the receiving recess 33 of the first case body 31 of the protective case 30. The adjustment component 60 further has two fixing elements 68 and two resilient elements 69. The two fixing elements 68 each have one end insertedly disposed in a corresponding one of the first fixing holes 34 of the protective case 30. The two fixing elements 68 each have the other end inserted disposed in and fixed to a corresponding one of the second fixing holes 62 of the fixing plate 61. The two resilient elements 69 fit around the fixing elements 68, respectively. The two resilient elements 69 each have one end abutting against the fixing plate 61. The two resilient elements 69 each have the other end abutting against the wall of the receiving recess 33 of the protective case 30. With the adjustment screw 66 being screwed to the adjustment screw hole 63 of the fixing plate 61, the knob 64 is rotated to drive the fixing plate 61 to move in the axial direction of the adjustment screw 66 and thereby compress the two resilient elements 69; hence, the two resilient elements 69 push the protective case 30, causing the protective case 30 to move in the radial direction of the annular saw blade 18.

To repair the saw blade positioning mechanism 20, a user demounts the two guide shafts 37 from the outer circumferential surface of the driving source 14 and then removes the protective case 30 and the first and second driven wheels 40, 50. In doing so, not only can the user change just a damaged part, but the demounting process is also easy and convenient, thereby enhancing the ease of maintenance. Upon completion of maintenance, the user mounts the protective case 30 on the driving source 14 by means of the two guide shafts 37, adjusts the position of the protective case 30 by means of the adjustment component 60 to ensure that the two first driven wheels 40 are insertedly engaged with the positioning annular grooves 183 of the annular saw blade 18 firmly, and exerts an outward force on the annular saw blade 18 to finalize the positioning of the annular saw blade 18. At this point in time, the two second driven wheels 50 adjust their own positions in response to the displacement of the protective case 30, so as to support the annular saw blade 18. Hence, the aforesaid assembly and adjustment are done in one step (by contrast, the prior art discloses mounting and adjusting the driven wheels one by one), so as to not only enhance the ease of demounting, mounting, and maintenance, but also enable the annular sawing machine to demonstrate high precision when assembled.

What is claimed is:

1. A saw blade positioning mechanism for an annular sawing machine, the annular sawing machine comprising a driving source, an annular saw blade, and an active wheel, with the annular saw blade having a first lateral side and a second lateral side facing away from the first lateral side, with the first lateral side having positioning annular grooves, with the active wheel connected to the driving source and engaged with an annular surface of the annular saw blade, the saw blade positioning mechanism comprising:
    a protective case, configured to be movably disposed on an outer circumferential surface of the driving source, and adapted to conceal a portion of the annular saw blade;
    two first driven wheels rotatably disposed in the protective case, configured to be positioned to flank the active wheel, and configured to be insertedly engaged with the positioning annular grooves of the first lateral side of the annular saw blade;
    two second driven wheels rotatably disposed in the protective case, configured to be positioned to flank the active wheel, and configured to abut against the second lateral side of the annular saw blade;
    two guide shafts parallel to each other; and
    an adjustment component disposed in the protective case to drive the protective case to move in a longitudinal direction of the two guide shafts,
    wherein the protective case has an active wheel recess and two guide shaft holes, wherein the active wheel recess is configured to adapt to contain the active wheel and is disposed between the two guide shaft holes, each of the two guide shaft holes of the protective case movably fits around a respective one of the two guide shafts, the two guide shafts are configured to be fixed to the outer circumferential surface of the driving source,
    wherein it is the movable fit between the two guide shafts with the respective shaft holes that allows for the driving of the protective case to take place.

2. The saw blade positioning mechanism for an annular sawing machine according to claim 1, wherein the protective case has a receiving recess, and the adjustment component has a fixing plate, a knob, and two resilient elements, with the fixing plate movably disposed in the receiving recess of the protective case and having an adjustment screw hole, with the knob having a knob head and an adjustment screw connected to the knob head, with the knob head disposed outside the receiving recess of the protective case, with the adjustment screw screwed to the adjustment screw hole of the fixing plate, wherein the adjustment screw has an end connected to the knob head and another end abutting against a wall of the receiving recess, wherein each of the two resilient elements has an end abutting against the fixing plate and another end abutting against the wall of the receiving recess.

3. The saw blade positioning mechanism for an annular sawing machine according to claim 2, wherein the protective case further has two opposing first fixing holes, and the fixing plate further has two opposing second fixing holes which flank the adjustment screw hole, with the adjustment component having two fixing elements, wherein the two fixing elements each have an end insertedly disposed in a corresponding one of the first fixing holes of the protective case and another end fixed to a corresponding one of the second fixing holes of the fixing plate, wherein the two resilient elements fit around the fixing elements, respectively.

* * * * *